United States Patent Office 2,894,065
Patented July 7, 1959

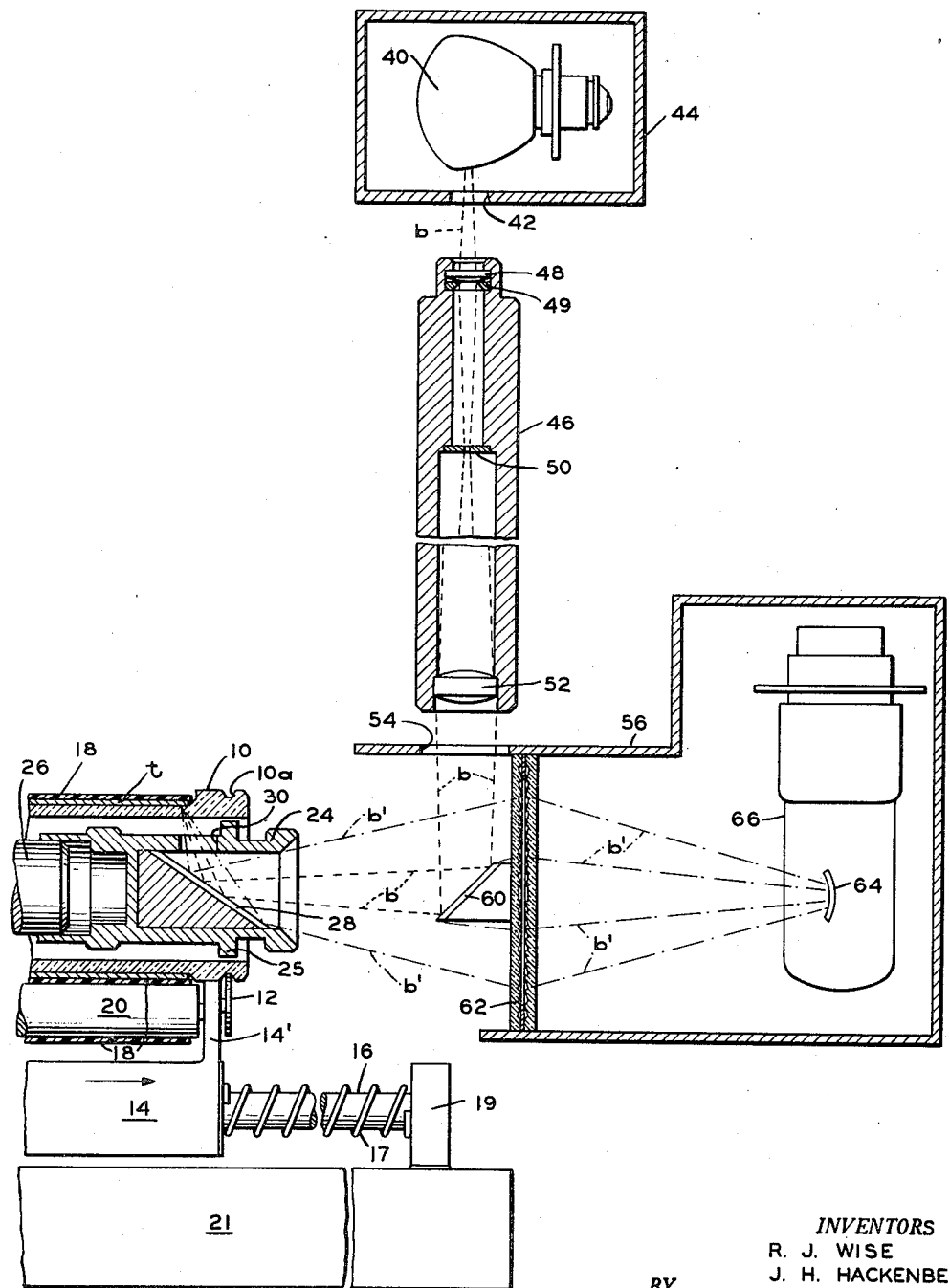

2,894,065

FACSIMILE OPTICAL SCANNING SYSTEM

Raleigh J. Wise, Arlington, N.J., John H. Hackenberg, Flushing, N.Y., and Garvice H. Ridings, Summit, N.J., assignors to The Western Union Telegraph Company, New York, N.Y., a corporation of New York Application June 20, 1955, Serial No. 516,578

7 Claims. (Cl. 178—7.1)

This invention relates to facsimile scanning apparatus, and more particularly to a novel and improved optical inside scanning system for a facsimile transmitter.

Optical systems for inside scanning of subject-matter copy on a transmitting blank carried by a cylinder or drum have heretofore been proposed, but in general such systems have involved complicated structure, such as lenses, exciter lamps and sometimes photocells, within the cylinder holding the blank, which structure is expensive to manufacture, difficult to align, and which also complicates servicing the machine.

In accordance with the instant invention a facsimile transmitting blank is curved or wrapped into cylindrical form, as around a cylinder, with the subject-matter on the blank facing inwardly for inside scanning, the wall of the cylinder being composed of a transparent material, for example, Lucite, through which a scanning light beam passes and is forced as a small light spot onto the subject-matter by means of a lens system and two mirrors, in which only one mirror is within the cylinder. The scanning beam enters at one end of the cylinder and is rotated around the inside of the cylindrical subject-matter copy by a mirror which is positioned within the transparent cylinder and mounted on the end of a shaft rotated by a scan motor, the shaft entering through the other end of the cylinder. The cylinder, with the transmitting blank thereon, is carried by a line-feed scanning carriage which is axially advanced at the proper rate so that a helical scanning path is traced by the light spot that impinges on the copy. Reflected light from the copy is picked up by the rotating mirror, and is brought out at the end of the cylinder where the scanning beam enters, and along the same path, and is focused onto the cathode of a phototube by means of a collector lens having a short focus, such as a Fresnel lens.

One of the objects of the invention is the provision of an improved optical inside scanning system for a facsimile transmitter, which is compact in size and in which only a scanning mirror with its driving shaft is required within the transparent cylinder that holds the transmitting blank.

Another object is the provision of suitable structure in which substantially only diffused light reflected from the transmitting blank is collected and applied to photocell structure, and in which the mirror light reflected from the transmitting blank and also from the inside wall of the transparent cylinder is directed away from the diffused light reflected from the blank in a manner to prevent the unwanted mirror reflections from glossy blanks or glossy characters from affecting the photocell response.

A further object relates to structure which enables the scanning light beam that impinges on the transmitting blank and the diffused light reflected from the transmitting blank, respectively, to enter and leave the same end of the transparent cylinder and in such manner as to prevent the scanning light beam and the reflected light beam from interfering with each other.

A still further object of this invention is the provision, in an optical scanning system, of a collector lens having a short focal length for collecting and focusing the reflected diffused light onto photosensitive structure in a manner to enable a large diameter lens to be employed as a light collector, while reducing the required dimensions of the lightproof casing within which the lens and photosensitive element are mounted.

Other objects and advantages will be apparent in connection with the following description and accompanying drawing showing a preferred embodiment of the system.

Referring to the drawing, reference numeral 10 indicates a transparent cylinder which usually, although not necessarily, is composed of Lucite, and wrapped thereon is a transmitting blank $t$ with the subject-matter copy facing inwardly. The blank may be wrapped or applied manually and without rotating the cylinder, if desired, but preferably the cylinder 10 is rotated through an angle of approximately 380° in order to completely wrap the blank. Means for manually rotating a transparent cylinder to cause a transmitting blank $t$ and an overlying flexible wrapper web 18 to be wrapped together around the outer periphery of the cylinder are disclosed in the U.S. Patent to Young No. 2,639,322, issued May 19, 1953, although preferably the blank is wrapped around the drum by motor-driven wrapper means generally in accordance with the wrapper apparatus disclosed in the U.S. application of Wise and Zabriskie, Serial No. 470,628, filed November 23, 1954, now Patent No. 2,872,275, issued Feb. 23, 1959, and in U.S. application of Ridings, Wise and Jelinek, Serial No. 514,959, filed June 15, 1955, both assigned to the assignee of the instant application.

Coaxially mounted within the transparent cylinder is a sleeve, or shield, member 24 which carries a front surface mirror 28 for applying the scanning beam $b$ through an opening 30 in member 24 and onto the inner surface of the transmiting blank $t$, the mirror also serving to collect a substantial portion of the diffused light reflected from the blank $t$. The member 24 is secured, in any suitable manner, to a shaft 26 which is rotated, either directly or through suitable gearing, by a scan motor to cause the member 24 and its mirror 28 to be rotated within the cylinder at the proper speed and cause the beam of incident light $b$ to describe a circle upon the inner face of the wrapped blank $t$. The aperture 30 is made just sufficiently large to pass the cone of reflected light $b'$ which is delimited by the diameter of the opening at the right hand end of the shield 24.

The cylinder 10 may be rotatably mounted in any suitable manner, for example, by means of pivotally-mounted rollers which enter a groove 10$a$ at each end of the cylinder in order to enable the cylinder to be rotated for the purpose of wrapping a transmitting blank thereon. One of these rollers is indicated at 12 in the figure; ordinarily three rollers are employed at each end of the cylinder, the rollers being spaced approximately 120° apart. A roller 20 may be employed to guide the wrapper web 18, if desired. It is necessary to provide relative longitudinal movement between the cylinder 10 and the mirror 28 by line-feed mechanism, and preferably the cylinder is caused to move axially relative to the scanning mirror. Therefore, the mounting roller 12 and the wrapper guide roller 20 are pivotally mounted as by an extending portion 14', on a longitudinally movable line-feed scanning carriage 14, so that the cylinder 10 may be advanced axially (to the right as viewed in the figure) by the line-feed carriage at the proper rate to effect a helical scanning operation for generating facsimile intelligence signals.

The scanning carriage may comprise any of various different types known in the art, but in the figure is shown as slidably mounted on a fixed rod 16, the carriage being advanced, from left to right as viewed in the figure, to effect a scanning operation, by any suitable carriage advancing means. When the carriage has been advanced to the right a distance sufficient to scan the area of the transmitting blank, a helical spring 17 having one end abutting against a stop member 19 secured to a base member 21, causes quick return of the carriage 14 to the left to its starting position, seen in the figure, in response to an end-of-message signal in known manner.

An exciter lamp 40, which may comprise a 32 C.P. tungsten filament lamp or other suitable source, is mounted within a light-proof casing 44. The scanning beam b from the exciter lamp passes through an aperture 42 in the casing 44 and thence through a light tube 46. The light tube includes a condenser lens 48, a light stop 49, a light aperture 50 and an objective lens 52. The latter lens causes a converging light beam to pass through an aperture 54 in a light-proof casing 56 and to be reflected by a fixed front surface mirror 60 and the rotating mirror 28 and focused as a spot of intense light, approximately 0.008 inch in diameter, upon the inner face of the wrapped transmitting blank through the wall of the transparent cylinder. The elements 28, 52 and 60 of the optical system are so constructed and spaced that the inner surface of the transmitting blank is at the focus of the lens 52. A portion of the diffused light reflected from the copy passes through an aperture 30 of the cylindrical mirror shield member 24 and impinges upon the rotating mirror 28 from which it is reflected in a diverging cone, now limited by the concentric aperture comprising the end of the mirror shield 24, to the surface of a double Fresnel lens 62 which collects the light and converges it onto the cathode 64 of a photomultiplier tube 66 to thereby generate facsimile intelligence signals in accordance with the subject matter on the transmitting blank.

The fixed mirror 60 may be oriented at an angle of 45° with respect to the light beam, but the rotary mirror 28 is so oriented as to cause the angle of incidence of the beam on the blank to be such that the angle of reflection, or so-called "mirror" reflection, is in a direction away from the opening 30 (to the left thereof as viewed in the figure) and hence only the diffused light as reflected from the transmitting blank will be returned through aperture 30 to the scanning mirror 28. The arrangement eliminates the glare angle and causes substantially only the diffused light as reflected to affect the photomultiplier tube 66. This is highly desirable since glare reflections from glossy tickets and also from glossy print or writing will reflect almost as much light as the background of the blank, whereas it is desired to obtain minimum reflection from the characters themselves. Also, the inside wall surface of the Lucite cylinder causes glare reflections, but the mirror shield 24 and particularly its flange 25 in conjunction with the angle of the scanning mirror 28 causes such reflections to be directed harmlessly in the opposite direction from that of the diffused light which is picked up by the photocell. The mirror preferably is orientated so that it is at an angle substantially less than 45° with respect to the incoming light beam; in practice the mirror is at an angle of approximately 34°. It may be noted that the rotating mirror could be oriented at an angle greater than 45° so that the mirror reflections from the sheet t and the walls of the cylinder 10 would be directed towards the open right-hand end of the cylinder 24, in which case the unwanted reflections would be trapped by the aperture 30 and flange 25 on the cylindrical light shield, but in this event since the mirror 28 would have to be moved further away from the open end of the cylinder 24, the longer light paths required would cause the solid angle of useful reflected light b' to be smaller since this is determined by the length of the path of the reflected light from the scanning spot to the open end of the light shield 24.

The reflected light beam b' passes around the edge of the mirror 60 and enters the double Fresnel lens 62 which collects the light and converges it onto the cathode element 64 located at the focus of the lens, the double Fresnel lens providing an inexpensive means of obtaining a large diameter lens with a short focal length whereby the photomultiplier tube 66 may be spaced relatively close to the collector lens, and thus enable the overall dimensions of the unit to be substantially reduced. It will be noted that in the system disclosed all optical components are stationary with the exception of the rotary scanning mirror 28 which is mounted on the motor shaft 26.

It will be understood that various alterations may be made in the present invention without departing from the spirit and scope thereof and it is intended that any and all alterations be considered within the purview of the present invention as defined by the appended claims.

What is claimed is:

1. Facsimile optical scanning apparatus comprising means for wrapping a transmitting blank into cylindrical form with the subject matter thereon facing inwardly for inside scanning, a rotatable drive shaft concentric with and extending into the cylindrical blank at one end thereof, a mirror shield mounted on the end of the drive shaft and a scanning mirror mounted within the mirror shield, means located outside of the other end of said cylindrical blank for producing a scanning light beam, means for directing said scanning beam into said other end of the cylindrical blank and onto the scanning mirror, said shield having an opening adjacent to said mirror whereby rotation of the mirror and shield will cause the scanning light beam reflected by the mirror to describe a circle upon the inner curved face of the transmitting blank, a line-feed carriage for causing relative longitudinal movement between the transmitting blank and the scanning mirror during a scanning operation, said scanning mirror being oriented relative to the incoming scanning light beam to cause the beam to impinge on said blank at an angle of incidence such that the mirror reflections from the blank are directed away from said scanning mirror, said mirror causing diffused light reflected from the blank to be directed back through said other end of the cylindrical blank and along the path of the incoming scanning light beam, and a short-focus collector lens spaced from said other end of the cylindrical blank for collecting said diffused light and focusing it onto a photosensitive element for producing facsimile signals in accordance with the subject matter scanned.

2. Facsimile optical scanning apparatus comprising a transparent cylinder around which a transmitting blank may be wrapped with the subject matter thereon facing inwardly for inside scanning through the wall of the cylinder, a rotatable drive shaft concentric with and extending into the cylinder at one end thereof, a mirror shield mounted on the end of the drive shaft and a scanning mirror mounted within the mirror shield, said shield having an open end adjacent to the other end of said cylinder, means located outside of said cylinder for producing a scanning light beam, means for directing the scanning beam into said open end of the mirror shield and onto the scanning mirror said shield having an opening intermediate its ends and adjacent to said mirror whereby rotation of the mirror and shield will cause the scanning light beam reflected by the mirror to describe a circle upon the inner curved face of the transmitting blank, a line-feed carriage for axially advancing the transparent cylinder with the transmitting blank thereon during a scanning operation, said scanning mirror being oriented relative to the incoming scanning light beam to cause the beam to impinge on said blank at an angle of incidence such that the mirror reflections from the blank and the surfaces of said cylinder are directed away from the scanning mirror, said mirror causing diffused light reflected from the blank through said opening in the mirror shield to be directed back through said open end thereof and along the path of the incoming scanning light beam, and a collector lens spaced from said other end of the cylinder for collecting said diffused light and focusing it onto a photosensitive element for producing facsimile signals in accordance with the subject matter scanned.

3. Scanning apparatus according to claim 2, in which said mirror shield has a peripheral portion thereof extending close to the inner surface of said cylinder to trap said mirror reflections from the blank and the surfaces of said cylinder and prevent them from interfering with the diffused light reflected from the blank.

4. Facsimile optical scanning apparatus comprising a transparent cylinder around which a transmitting blank may be wrapped with the subject matter thereon facing inwardly for inside scanning through the wall of the cylinder, a rotatable drive shaft concentric with and extending into the cylinder at one end thereof, a cylindrical mirror shield coaxially mounted on the end of the drive shaft and a scanning mirror mounted within the mirror shield, said shield having an open end adjacent to the other end of said cylinder, means located outside of said cylinder for producing a scanning light beam, means for directing the scanning beam into said open end of the mirror shield and onto the scanning mirror, said shield having an opening intermediate its ends and adjacent to said mirror whereby rotation of the mirror and shield will cause the scanning light beam reflected by the mirror to describe a circle upon the inner curved face of the transmitting blank, a line-feed carriage for axially advancing the transparent cylinder with the transmitting blank thereon during a scanning operation, said scanning mirror being oriented relative to the incoming scanning light beam to cause the beam to impinge on said blank at an angle of incidence that differs from an angle of 90° by an amount sufficient to cause the mirror reflections from the blank and the surfaces of said transparent cylinder to be directed away from the scanning mirror, said mirror causing diffused light reflected from the blank through said opening in the mirror shield to be directed back through said open end thereof and along the path of the incoming scanning light beam, and a short-focus collector lens spaced from said other end of the cylinder for collecting said diffused light and focusing it onto a photosensitive element for producing facsimile signals in accordance with the subject matter scanned.

5. Facsimile optical scanning apparatus comprising a transparent cylinder around which a transmitting blank may be wrapped with the subject matter thereon facing inwardly for inside scanning through the wall of the cylinder, a rotatable drive shaft concentric with and extending into the cylinder at one end thereof, a cylindrical mirror shield coaxially mounted on the end of the drive shaft and a scanning mirror mounted within the mirror shield, said shield having an open end adjacent to the other end of said cylinder, means located outside of said cylinder for producing a scanning light beam, means for directing the scanning beam into said open end of the mirror shield and onto the scanning mirror, said mirror shield having an opening intermediate its ends and adjacent to said mirror whereby rotation of the mirror and shield will cause the scanning light beam reflected by the mirror to describe a circle upon the inner curved face of the transmitting blank, a line-feed carriage for axially advancing the transparent cylinder with the transmitting blank thereon during a scanning operation, said scanning mirror being oriented at an angle of approximately 34° relative to the incoming scanning light beam to cause the beam to impinge on said blank at an angle of incidence such that the mirror reflections from the blank and the surfaces of said transparent cylinder are directed away from said open end of the mirror shield and also away from the scanning mirror, said mirror causing diffused light reflected from the blank to be directed back through said open end of the mirror shield and along the path of the incoming scanning light beam, and a collector lens spaced from said other end of the cylinder for collecting said diffused light and focusing it onto a photosensitive element for producing facsimile signals in accordance with the subject matter scanned.

6. Facsimile optical scanning apparatus comprising a transparent cylinder around which a transmitting blank may be wrapped with the subject matter thereon facing inwardly for inside scanning through the wall of the cylinder, a rotatable drive shaft concentric with and extending into the cylinder at one end thereof, a mirror shield mounted on the end of the drive shaft and a scanning mirror mounted within the mirror shield, means located outside of the other end of said cylinder for producing a scanning light beam, means including a stationary mirror positioned adjacent to said other end of the cylinder for directing the scanning light beam into said other end of the cylinder and along the axis thereof, said shield having an opening adjacent to said mirror whereby rotation of the mirror and shield will cause the scanning light beam reflected by the mirror to describe a circle upon the inner curved face of the transmitting blank, a line-feed carriage for axially advancing the transparent cylinder with the transmitting blank thereon during a scanning operation, said scanning mirror being oriented relative to the incoming scanning light beam to cause the beam to impinge on said blank at an angle of incidence such that the mirror reflections from the blank and the surfaces of said transparent cylinder are directed away from the scanning mirror, said scanning mirror causing diffused light reflected from the blank to be directed back through said other end of the cylinder along the path of the incoming scanning light beam and around the periphery of said stationary mirror, and a short-focus collector lens adjacent to said stationary mirror for collecting said diffused light passing around the periphery of the stationary mirror and focusing it onto a photosensitive element for producing facsimile signals in accordance with the subject matter scanned.

7. Scanning apparatus according to claim 6, in which said collector lens is a Fresnel lens having a collecting area substantially greater than the reflecting area of said stationary mirror.

References Cited in the file of this patent

UNITED STATES PATENTS

| | | |
|---|---|---|
| 2,179,002 | Washington | Nov. 7, 1939 |
| 2,393,631 | Harrison et al. | Jan. 29, 1946 |
| 2,394,649 | Young | Feb. 12, 1946 |
| 2,582,073 | Scudder | Jan. 8, 1952 |
| 2,670,665 | Caldwell | Mar. 2, 1954 |